No. 798,508. PATENTED AUG. 29, 1905.
H. HARMON.
PNEUMATIC TIRE CAP.
APPLICATION FILED OCT. 10, 1904.

Attest:
John Enders.
M. H. Holmes.

Inventor:
Henry Harmon,
by Robert Burns
Attorney.

UNITED STATES PATENT OFFICE.

HENRY HARMON, OF CHICAGO, ILLINOIS, ASSIGNOR TO THE HARMON MANUFACTURING AND DISTRIBUTING COMPANY, OF CHICAGO, ILLINOIS, A CORPORATION OF ILLINOIS.

PNEUMATIC-TIRE CAP.

No. 798,508.  Specification of Letters Patent.  Patented Aug. 29, 1905.

Application filed October 10, 1904. Serial No. 227,770.

*To all whom it may concern:*

Be it known that I, HENRY HARMON, a citizen of the United States of America, and a resident of Chicago, in the county of Cook and State of Illinois, have invented certain new and useful Improvements in Pneumatic-Tire Caps, of which the following is a specification.

The present invention relates to a protecting-cap for inflatable and collapsible pneumatic tires, and has for its object to provide a simple and efficient structural arrangement and combination of parts by which a cap is afforded that is capable of easy and convenient application and removal without the necessity of recessing the tread of a tire, and thus weakening the tire, and which is adapted to maintain its proper position upon a pneumatic tire without materially interfering with the flexibility and resiliency of the tread parts of the tire, while affording the same protection against punctures and the like, all as will hereinafter more fully appear.

Figure 1:
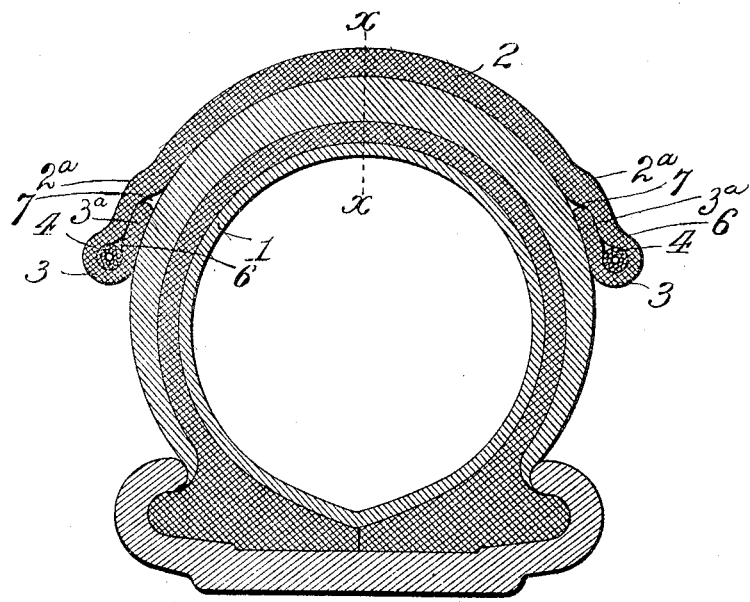
Figure 2:
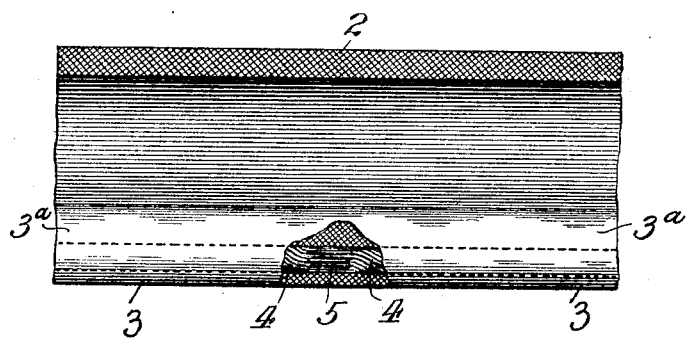

In the accompanying drawings, Figure 1 is a transverse sectional elevation illustrating the present tire-cap in place upon an ordinary form of pneumatic tire. Fig. 2 is a fragmentary longitudinal section at line $x$ $x$, Fig. 1, of the tire-cap, portions of a depending margin being broken away to better illustrate the marginal construction of the cap and a ring of twisted strands.

Referring to the drawings, 1 represents an inflatable and collapsible pneumatic tire of the usual construction.

2 is the annular tire-cap superposed upon the tire instead of, as heretofore applied, being recessed into the tread, and which in the present construction has a crescent or segmental shape in cross-section in contradistinction to being semicircular in cross-section, thus adapting it to closely fit and hug the surface of the crown or tread of the pneumatic tire so as to be held thereto, and the free marginal edges 3 of such cap are extended laterally at each side and folded within themselves to form inside laps $3^a$ and pockets 6 for the reception of the holding-rings 4, hereinafter described. Between the laps and the caps are dead-air spaces 7, and adjacent thereto the cap has reinforcing enlargements $2^a$.

The tire-cap is formed in the main of closely-woven fabric similar in manufacture to the ordinary woven fire-hose in general use and which affords a material which is very pliable and at the same time practically inextensible and puncture-proof when used as a tire-cap, the necessary quality of tractility or the traction of adhesion being attained by a coating of vulcanized rubber or the like on one or both surfaces of said cap.

4 represents a pair of counterpart holding-rings arranged yieldingly in the marginal pockets 3 aforesaid of the tire-cap and each having a diameter sufficiently smaller than the greater diameter of the periphery of the pneumatic tire to bring said holding-rings slightly beyond the crown of said tire and outside the greatest transverse diameter of such tire, as illustrated in Fig. 1 of the drawings. A material part of the present improvement consists in the formation of such holding-rings of a series of wire strands twisted together in a manner similar to wire rope or cable and connected together at their meeting ends by a brazed, welded, or like joint 5 to form endless and non-extensible rings having ample strength and at the same time a maximum degree of pliability, so as not to materially interfere with the normal pliability and resiliency of a pneumatic tire to which they are applied, while permitting the margins of the cap to yield laterally, circumferentially, and radially.

This present tire-cap under ordinary conditions will be held against shifting by the adhesion of its inner surface upon the outer surface of the pneumatic tire when the same is properly inflated. Where greater security is required, a connecting-cement or other usual and common provision may be used to attain greater adhesion between the aforesaid surfaces of the tire and the cap.

Having thus fully described my said invention, what I claim as new, and desire to secure by Letters Patent, is—

1. A pneumatic-tire cap constructed of flexible non-extensible material and of crescent shape in cross-section having free marginal edges formed with inside laps providing pockets and adapted to rest upon the surface of the tire and to extend slightly beyond the tread thereof, and to closely fit or hug the surface of the tire, with its pockets located at a distance away from the rim of the wheel, and twisted-wire rings located yieldingly within the pockets for retaining the cap in position without interfering with the flexure of the tire while permitting the margins of the cap to yield laterally, circumferentially and radially.

2. A pneumatic-tire cap constructed of flexible non-extensible material and of crescent shape in cross-section, with reinforcing enlargements and marginal edges formed with inside laps providing pockets and extending to points adjacent to the reinforcing enlargements leaving dead-air spaces inside of the reinforcing enlargements, and twisted-wire rings located yieldingly within the pockets for retaining the cap in position without interfering with the flexure of the tire; the marginal edges adapted to extend slightly within the tread of a tire with its pockets located at a distance away from the rim of the wheel.

Signed at Chicago, Illinois, this 8th day of October, 1904.

HENRY HARMON.

Witnesses:
ROBERT BURNS,
M. H. HOLMES.